(12) United States Patent
Bergkvist

(10) Patent No.: US 7,064,704 B2
(45) Date of Patent: Jun. 20, 2006

(54) APPARATUS FOR RADAR

(75) Inventor: Bengt Bergkvist, Järfälla (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 10/835,574

(22) Filed: Apr. 30, 2004

(65) Prior Publication Data

US 2005/0035903 A1 Feb. 17, 2005

(30) Foreign Application Priority Data

May 5, 2003 (SE) ................................. 0301282

(51) Int. Cl.
  *G01S 13/20* (2006.01)
  *G01S 13/522* (2006.01)
(52) U.S. Cl. .................... 342/160; 342/89; 342/94; 342/118; 342/134; 342/137; 342/159; 342/162; 342/175; 342/195
(58) Field of Classification Search .......... 342/82–103, 342/118, 134–144, 159–164, 175, 195
See application file for complete search history.

(56) References Cited

U.S. PATENT DOCUMENTS

| | | | | |
|---|---|---|---|---|
| 3,491,360 A | * | 1/1970 | Stoorvogel | .................. 342/137 |
| 4,049,953 A | * | 9/1977 | Evans, Jr. | ................... 342/137 |
| 4,057,800 A | | 11/1977 | Ganz | |
| 4,106,019 A | | 8/1978 | Alexander et al. | |
| 4,679,050 A | * | 7/1987 | Bergman | .................... 342/137 |
| 4,714,927 A | | 12/1987 | Siegel et al. | |
| 4,730,189 A | * | 3/1988 | Siegel et al. | ................. 342/137 |
| 4,973,968 A | | 11/1990 | Hurd | |
| 6,081,221 A | * | 6/2000 | Zrnic et al. | .................. 342/137 |
| 6,720,909 B1 | * | 4/2004 | Dedden | ....................... 342/137 |

FOREIGN PATENT DOCUMENTS

| | | |
|---|---|---|
| GB | 2335103 A | 9/1999 |
| JP | 64-50978 A * | 2/1989 |
| WO | WO 9947944 A1 | 9/1999 |

* cited by examiner

*Primary Examiner*—Bernarr E. Gregory
(74) *Attorney, Agent, or Firm*—Venable LLP; Eric J. Franklin

(57) ABSTRACT

A radar transmits electromagnetic energy in pulse repetition intervals and receives reflections from objects in range gates including Doppler filters. The radar approves desirable ambiguous echoes and suppresses ambiguous echoes of no interest or that interfere with the radar's display. The radar frequency varies according to a staggered or wobbling pattern. The ambiguous echoes produce one pulse in the range gates within a predetermined number of periods. The Doppler filter works with an impulse function response that includes a small number of samples. The Doppler filter, during the predetermined number of periods, gives rise to independent samples from reflectors within the radar's unambiguous range. When the independent samples exceed the small number of samples, the radar approves the ambiguous echo. Otherwise, it is suppressed. In this way, ambiguous echoes are prevented from interfering with the reception or display of echoes. The suppression of asynchronous interferences can be made easier.

28 Claims, 2 Drawing Sheets

APPARATUS FOR RADAR

FIELD OF THE INVENTION

The present invention relates to an apparatus for radar that is arranged to transmit electromagnetic energy in the form of pulses with given or predetermined intervals and to receive reflections or echoes from objects that reflect the electromagnetic energy. The radar works with time intervals with a fixed delay relative to the transmitted pulse and range gates in which the echoes are received. The time delay between successive received pulses will vary from pulse to pulse with a radially moving target which can be transferred, using known Doppler radar technology, to a varying phase position relative to a stable reference oscillator. By passing the signals through a high pass filter, non-moving echoes can be suppressed, so-called MTI technology. In addition, the radar is to approve ambiguous echoes that are desirable and to suppress ambiguous echoes that are of no interest or that interfere with the display function of the radar.

BACKGROUND OF THE INVENTION

The target echoes that, due to the delay in the propagation path, incide on the radar after a new radar pulse has been transmitted, will be allocated a range gate corresponding to the actual propagation time minus the previously utilized pulse repetition interval. The measurement of range hereby becomes ambiguous, which is normally not desirable of the radar. If the phase position of the transmitted radar pulse relative to the reference oscillator is constant from pulse to pulse, so-called coherent-on-transmit radar, non-moving second-time-around echoes will, however, also be suppressed by the radar's MTI filter, assuming the radar utilizes a constant pulse repetition frequency. For radars that utilize transmitters with a relative phase position that varies between successive pulses, for example magnetron radars, Doppler filtering can only be achieved by measuring the actual phase position of the most recently transmitted pulse and thereafter, by various known methods, subtracting this phase position from phase positions measured in the various range gates. Such radars are called coherent-on-receive radars. By means of such methods, suppression of slowly moving targets can also be achieved with a magnetron radar, but normally only for echoes within the radar's unambiguous range, due to the fact that first-time-around echoes and second-time-around echoes cannot be distinguished.

In accordance with the present invention, so-called PRI variation is to be used (PRI=Pulse Repetition Interval). The use of PRI variation leads to ambiguous echoes, where such occur, appearing at different ranges from pulse to pulse. High pass filtering of such signals in range gates results in each individual incoming echo being given a length that is determined by the impulse function response of the filter. This means that the number of independent measurements during a radar pass is limited and thereby the opportunities to utilize the duration of an indication rather than amplitude as a measurement of occurrence are reduced. By selecting a high pass filter with short impulse function response in relation to the measuring period, several independent measurements can be obtained during this measuring period and the previous method with M/N filter is utilized (M=primary detections; N=number of range gates). The M/N detector can also be called a non-parametric detector and is characterized in that an echo must appear during a number of measurements in order to be able to give rise to a detection, irrespective of the amplitude of the incoming impulse or signal. For coherent-on-receive radar stations, second-time-around echoes will not have any phase relation from pulse to pulse. Both fixed and moving echoes will therefore be able to pass through the high pass filtering of an MTI irrespective of whether fixed or variable PRI is used. For a coherent-on-transmit radar with fixed PRI, non-moving second-time-around echoes will in principle be suppressed, but not, however, moving second-time-around echoes. For a coherent-on-transmit radar with variable PRI, successive second-time-around echoes will fall in different range gates and will be perceived by the radar as impulses, that is impossible to suppress by normal high pass filtering. Radar that uses constant PRI will suppress both targets that have a phase variation that is low and those that have corresponding variation with a frequency that conforms to the selected pulse repetition frequency. These are called blind speeds. In order to eliminate such blind speeds, coherent-on-transmit radar stations often utilize PRI that alternates between different rotations of the radar, which gives an even lower data rate. By utilizing PRI alternating from pulse to pulse, a small reduction of the suppression capability of slow clutter is certainly achieved, but the gains with a higher data rate can in many cases outweigh this. In environments where second-time-around echoes occur, the degradation in performance of the radar as a result of this can, however, often be too large, unless the present invention is utilized. M/N detectors are also used to suppress non-correlated interference, for example from other radar stations. By the selection of short impulse function response of the radar in combination with M/N detector, such interference can also be eliminated.

Radars of different types are already known and reference can be made, for instance, to U.S. Pat. No. 4,973,968, in which it is proposed to use a number of fixed pulse repetition intervals (PRI) and to use separate target detection for each such pulse repetition interval. A combination logic is used in connection with this. This is a method that is difficult to use for transmitter elements that have frequency change characteristics that depend greatly upon the current power factor of the transmitter. For such stations, a pulse length change can, it is true, be introduced at the same time as PRI variation in order to retain the power factor, but such a method can seldom be justified economically for, for example, a magnetron radar. Refer also to GB 2 335 103 that proposes the use of short pulse repetition intervals together with long pulse repetition intervals, in order by this means to be able to note the position of second-time-around echoes. The measured target amplitude of these echoes is thereafter subtracted from the positions in which they are expected to appear from the short pulse repetition intervals. This method suffers from the same problem with varying power factor as the previous method. In addition, the sensitivity of the detection of second-time-around echoes for the "normal" pulse rates by integration can be made greater than the sensitivity for the individual measurement pulses, which makes the method unreliable.

In PCT document WO 99/47944, the use is already known of a method for resolving measurements with a radar that is ambiguous in range. Detections are noted in the different range gates and attempt is made to associate them with a range. The method proposed here is often utilized in radar stations with such a high pulse repetition frequency that unambiguity cannot be achieved within the required range area. The method works well for one target, but association difficulties arise even for only two or more.

The present invention relates among other things to an apparatus for suppressing the display of echoes at ranges larger than the unambiguous range. The range to an object is estimated normally within the delay that the incoming echo has with reference to the most recently transmitted pulse. If the delay is so large that a new pulse has been able to be transmitted before the signal returns, the echo range will be estimated in relation to the most recently transmitted pulse and too short a range will be given. Such echoes, so-called ambiguous echoes, can be perceived as being close by and hence in many cases prioritized targets, and both block the detection of targets at unambiguous range and normally interfere with the display. This problem can be eliminated by changing the radar frequency between each pulse. Such a method requires, however, a transmitter that can generate such pulses and, in addition, in certain cases this method is not compatible with tactical operating requirements. Nor is a frequency hop from pulse to pulse compatible with filtering in order to suppress non-moving echoes, which requires fixed frequency.

The indicated range of the ambiguous echoes is determined by the relevant pulse repetition interval. By changing this, the ambiguous echoes will be able to appear at several indicated ranges in the form of individual pulses or impulses. If the radar utilizes Doppler filtration by letting the echoes in each range gate pass through a filter with suitable frequency characteristics, this filter's impulse function response will disperse the energy from each pulse in the relevant gate. After such a filter, the occurrence of the original impulse can therefore not be detected simply and nor can it be eliminated simply.

The apparatus according to said document U.S. Pat. No. 4,973,968 works with a requirement of the start of several pulse repetition intervals which could cause problems with first-time-around targets that are in the vicinity of the system's blind speeds. The other patent documents mentioned above deal, in principle, with other problems to those stated above.

SUMMARY OF THE INVENTION

The present invention is intended to solve all or parts of the problems described above.

The principal characteristics of an apparatus that solves the problems described above are, among other things, that the radar works with a varying frequency according to a staggered or wobbling pattern and that the respective Doppler filter concerned is arranged to work with an impulse function response with a length that is significantly shorter than a predetermined number of periods, for example eight periods. Further characteristics are that, upon the appearance in the radar of a representative single impulse for a second-time-around echo, a third-time-around echo, a fourth-time-around echo, etc., the Doppler filter concerned is arranged to emit an output impulse/output signal which, in its duration or length, is significantly shorter than the corresponding duration or length of the output impulse/output signal caused by the measured first-time-around echo, and that the radar also comprises one or more threshold functions which, irrespective of the amplitudes of the said representative single impulses, generate significantly fewer incidences of threshold exceeding than corresponding first-time-around impulses, thus producing output impulses/output signals for a plurality of pulse intervals. In this way, the radar is arranged to ascertain the differences between the said incidences of threshold exceeding and to use these as the basis for the approval or the suppression.

In a preferred embodiment, the PRI pattern used by the radar is such a shape that, during one pass period, only one response comes in from a second- (third-, fourth-, etc.) time-around echo in each range gate concerned, while the normal first-time-around echo gives a signal for each measurement pulse.

In further developments of the concept of the invention, the respective ambiguous echo for each completed PRI pattern only produces one impulse within the predetermined number of periods. In addition, the radar is arranged to work with the requirement that at least a predetermined number of samples/pulses, for example six out of eight samples/pulses, must exceed a predetermined or primary threshold to obtain the said approval. In addition, the Doppler filter can comprise a second order delay line. The invention is thus based on the idea of using a number of different pulse intervals, which for an MTI radar means that the frequency of radially moving targets will vary with a modulation index that is proportional to the radial target speed. This technique also makes possible coverage of radial speeds that give rise to frequencies that coincide with the average pulse repetition frequency, so-called blind speeds, which is known technology. For second-time-around echoes that do not incide into the same range gate at the different pulse repetition intervals, such echoes will give rise to individual impulses in the range gates concerned, which means that slow-moving echoes can also not be suppressed by being passed through a high pass filter, even for radar stations with known transmitter pulse phase. By means of the invention, suppression of blind speeds can make possible a higher measurement rate than alternative methods with frequency changing between successive passes, which means that PRF variation is also of interest for coherent radar stations and the present proposal to reduce the risk of penetration of ambiguous echoes eliminates a known disadvantage associated with the utilization of PRF variation.

By combining the utilization of PRI variation, the MTI technology can also be used for discovering and thereby also filtering out fixed or moving ambiguous echoes that have a lower amplitude than reflected signals from occurring interference reflections of the ground clutter or rain clutter type.

By means of what is proposed above, the problem mentioned by way of introduction can be given a relatively simple solution from a technical point of view. So-called non-parametric detection can be utilized. The combination with coherent clutter suppression is new and the use in combination with fully coherent radar has exceptional advantages. The invention can also eliminate disadvantages that can arise in the event of non PRI synchronous interference. Such interference can, for example, arise with the use of M/N filters that are used to suppress pulses that can arrive stochastically to the radar from other radar stations. The use of an MTI filter means that interfering pulses are prolonged, which previously made it more difficult to use M/N filters for suppression.

BRIEF DESCRIPTION OF THE DRAWINGS

A currently proposed embodiment of an apparatus that has the significant characteristics of the invention will be described below with reference to the attached drawings in which.

DETAILED DESCRIPTION OF EMBODIMENTS OF THE INVENTION

Figure 1:
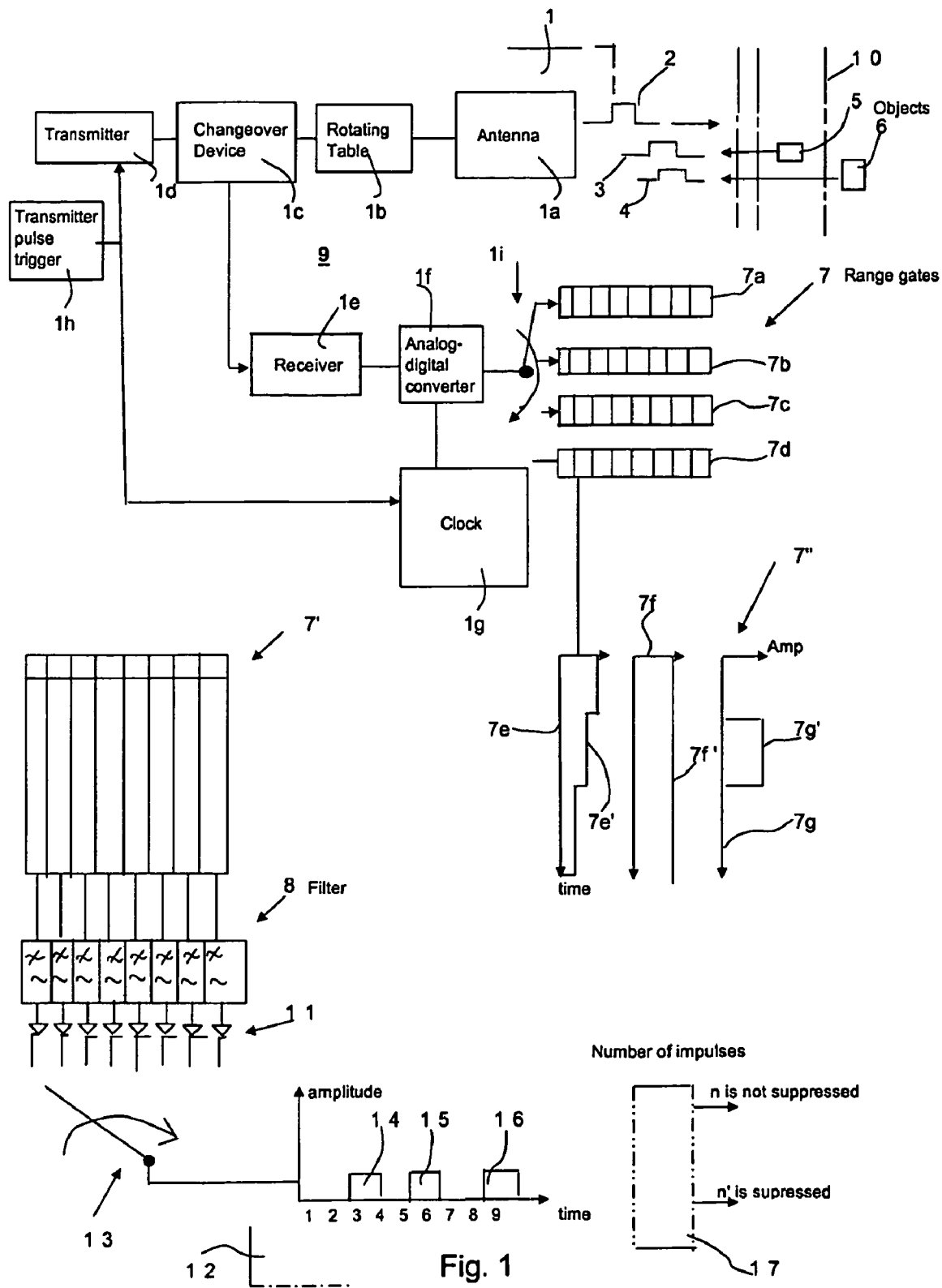
FIG. 1 shows schematically in outline form a radar that transmits pulses and receives echoes from detected objects.

FIG. 1 shows a radar illustrated symbolically by 1. The radar is arranged to transmit electromagnetic energy or pulses 2 in pulse repetition intervals PRI and to receive reflections or echoes 3, 4 from objects 5, 6 that reflect the electromagnetic energy. The radar is arranged with range gates that are indicated in outline by 7, 7', 7". The respective range gates are provided with or interact with a Doppler filter or high pass filter 8. The radar works with a frequency that varies in accordance with a staggered or wobbling pattern. The functions achieved by the radar 1 are symbolized in outline by 9. The radar comprises an antenna 1a that is arranged to be able to rotate, with a rotating table 1b. A changeover device 1c connects the rotation table/antenna in turn to a transmitter 1d and a receiver 1e. The receiver 1e is connected to an analog-digital converter 1f. A clock is indicated by 1g and controls the transmitter and receiver circuits with a frequency related to the transmitted pulse length. The clock is connected to the transmitter 1d and the converter 1f. A transmitter pulse trigger 1h is also connected to the transmitter by means of which the staggering or wobbling function can be generated. After each transmitted pulse, the analog-digital converter if can be connected in turn to range gates 7a, 7b, 7c, 7d via a switch 1i. By means of the apparatus, impulses with varying pulse repetition intervals can be transmitted and received via the antenna 1a.

The range gates, for example 7', can be connected to a subsequent high pass filter/Doppler filter 8, which is provided with a threshold device 11 indicated symbolically, via which the range gates can be connected to a unit 12 with synthetic video indicated symbolically. The range gates 7' are connected one by one to the unit 12 via a switch 13. The reflections 14, 15, 16 caused by the incoming echoes appear in the unit 12 in different numbers depending upon the position of the reflection-transmitting or echo-transmitting target or surroundings in relation to the unambiguous range of the previous pulse. The range gates 7" are intended to illustrate the amplitudes of impulses as a function of time, with the range gate 7e showing the case with a moving echo, the range gate 7f showing the case with a fixed echo and the range gate 7g showing the case with varying PRI impulse repetition interval. In the case 7e, the amplitude 7e' varies with the time, in the case 7f, the amplitude 7f is constant, and in the case 7g, there is the appearance of impulses 7g' with different intervals. In accordance with the PRI variation or the PRI pattern, only one response should come in from each respective second-time-around echo, third-time-around echo and/or fourth-time-around echo, etc., in each range gate concerned. On the other hand, the first-time-around echo is to give a signal/impulse for each measurement pulse.

Depending upon the signal or impulse processing in the range gates 7', the high pass filter 8 and the threshold device 11, different numbers n, n' of independent outgoing pulses are obtained in the unit in accordance with the above. The radar or the apparatus associated with this suppresses or permits, by means of a unit or circuit 17, the display on the radar's display unit of the echo in question. In the event of the number n, which here represents a large number, display is permitted, while the number n' here represents individual or a few incidences of threshold exceeding that are suppressed in the display. The echoes or the reflections 3, 4 can be divided up into echoes 3 that provide impulses that reach the radar before the next pulse has been transmitted and echoes 4 that arise from objects 6 at a range that is so large that the echo reaches the receiver after the next impulse has been transmitted. Echoes that arise after a new pulse has been transmitted are called here ambiguous echoes. The radar's unambiguous range is often taken to be the range that corresponds to the shortest utilized PRI interval. The ambiguous echo can, in principle, consist of an echo that is to be able to be recorded by the radar or an echo that is to be suppressed as it can impair or interfere with the rest of the display. The indication range of the pulses varies in accordance with a staggered or wobbling pattern in a known way. The respective range gates receive only one pulse within a number of periods, for example eight periods. The respective Doppler filter 8 concerned is arranged to work with an impulse function response that affects only a few samples/pulses, for example, three samples or pulses. The Doppler filter is also arranged to cause statistically a number of independent samples/pulses during the said predetermined number of periods. In the case when the independent samples or pulses exceed the said small number of samples or pulses, this is detected by the unit 17 which causes the radar to enter the echo in question on its display unit. In the case when the number of measurements above a level, determined by the radar's noise or interference background, is less than a given value, for example a value 5 for measurements over eight samples, the signal is not displayed, while the signal is displayed if the number exceeds this value.

In an embodiment, the apparatus or the radar can work with a requirement that is based on a predetermined number of samples or pulses having to exceed a predetermined amplitude threshold in order to obtain the said approval. Thus, for example, six out of eight samples or pulses must exceed the threshold in order to obtain approval. The Doppler filter can consist of a second order delay line 17 that brings about the short impulse function response from the filter. The radar can consist of a non-coherent MTI radar where there is no coherence between transmitted signals 2. Alternatively, the radar consist of a coherent-on-transmit radar or a coherent-on-receive radar. An M/N detector function that is not specially illustrated is included in the receiving apparatus and arranged in a known way, which M/N detector function enables the same echo to appear during a number of measurements in order to be able to give rise to a detection irrespective of the amplitude of the incoming pulse or signal.

Figure 2:
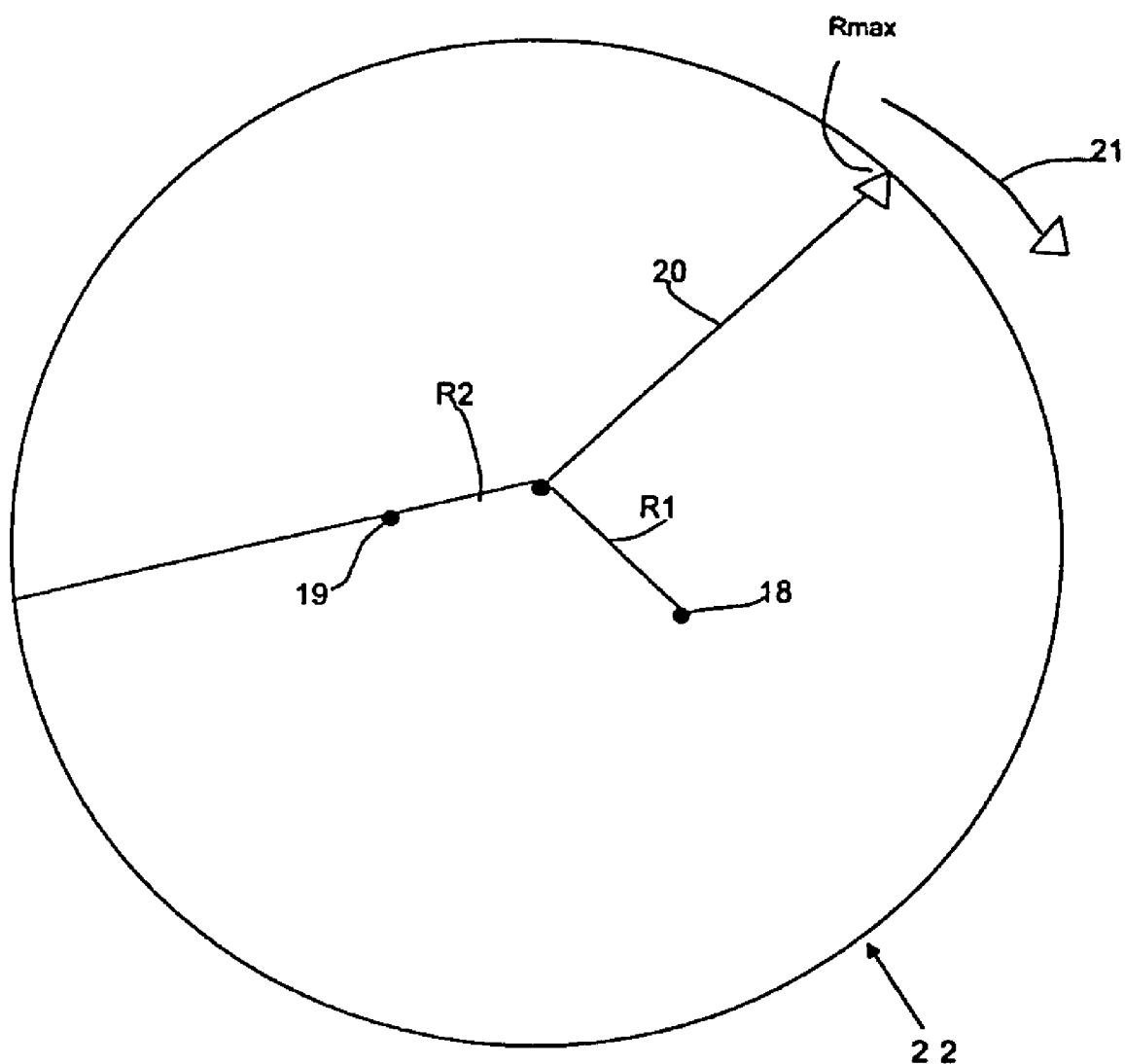
FIG. 2 shows in outline the display apparatus of the radars.

In FIG. 2, the radar's display unit is shown in outline, consisting of a plan position indicator upon which approved signals are displayed with the range that is proportional to the echo's measured delay relative to the most recent pulse and an angular position that depicts the direction of the antenna at the time of the measurement. At a radius R1 there is an echo 18 from a target 5 within the unambiguous range (cf. FIG. 1). An echo 19 at an ambiguous range R2+R comes from a target that gives ambiguous echoes. The rotation function of the display unit is indicated by 21. The display unit as such is symbolized by 22.

The components listed above can consist of known types and will therefore not be described in greater detail.

The invention is not limited to the embodiment described above by way of example, but can be modified within the framework of the following patent claims and concept of the invention.

The invention claimed is:

1. A radar apparatus operative to selectively filter ambiguous echoes, comprising:
   a transmitter operative to transmit electromagnetic pulses in varying pulse repetition intervals;

range gates operative to receive energy impulses reflected by at least one object;

a Doppler filter operative to work with an impulse function response having a length that is significantly shorter than a predetermined number of periods and thereby to produce for a received impulse a number of outgoing impulses, wherein upon the appearance in the radar of a representative single impulse for a plurality of echoes, the Doppler filter emits an output impulse that is significantly shorter than the output impulse signal caused by a first of the echoes; and at least one threshold device that, irrespective of the amplitudes of the representative single impulses, generates fewer incidences of threshold exceeding than a corresponding first-time-around impulse, thus producing output impulses for a plurality of pulse intervals, with the radar being operative to ascertain the differences between the incidences of threshold exceeding and to use these as the basis for the filtering.

2. The radar apparatus according to claim 1, wherein the system filters out ambiguous echoes that are of no interest.

3. The radar apparatus according to claim 1, wherein the system filters out ambiguous echoes that interfere with the display of the radar.

4. The radar apparatus according to claim 1, wherein the Doppler filter emits an output impulse that is significantly shorter is duration than the output impulse signal caused by a first of the echoes.

5. The radar apparatus according to claim 1, wherein the Doppler filter emits an output impulse that is significantly shorter in length than the output impulse signal caused by a first of the echoes.

6. The radar apparatus according to claim 1, wherein the predetermined number of periods is eight periods.

7. The radar apparatus according to claim 1, wherein the number of outgoing impulses is three.

8. The radar apparatus according to claim 1, wherein the Doppler filter emits output impulse that is significantly shorter than the output impulse signal caused by a first of the echoes upon the appearance in the radar of a representative single impulse for two to four echoes.

9. The radar apparatus according to claim 1, wherein the pulse repetition intervals have a variable frequency.

10. The radar apparatus according to claim 1, wherein the pulse repetition interval varies such that, during one pass in the radar, only one response comes in from a subsequent echo in each range gate, while the first of the echoes gives an impulse for each measurement pulse.

11. The radar apparatus according to claim 10, wherein the respective ambiguous echo is arranged to produce only one impulse in the respective range gate within the predetermined number of periods.

12. The radar apparatus according to claim 1, wherein the basis for the filtering comprises at least a predetermined number of samples/pulses exceeding a predetermined threshold.

13. The radar apparatus according to claim 12, wherein an ambiguous echo is not filtered if six out of eight samples/pulses exceed the predetermined threshold.

14. The radar apparatus according to claim 1, wherein the Doppler filter comprises a second order delay line.

15. The radar apparatus according to claim 1, wherein the radar comprises coherent-on-receive radar, without coherence between successively transmitted adjacent pulses.

16. The radar apparatus according to claim 1, wherein the radar comprises coherent-on-transmit radar operative to utilize varying pulse repetition intervals during a pass and thereby make possible detection of targets at all occurring speeds and thereby a better reconnaissance rate in combination with the ability to suppress second-time-around echoes, from both moving and fixed targets.

17. The radar apparatus according to claim 16, wherein the radar is arranged to suppress ambiguous echoes, even with amplitudes lower than corresponding amplitudes from actual clutter background.

18. The radar apparatus according to claim 1, wherein the radar apparatus works with an alternating sequence related to the pulse repetition interval, which sequence spreads multiple-time-around echoes maximally over a given measuring period.

19. The radar apparatus according to claim 1, further comprising:

an MTI filter operative to provide several independent samples or co-ordinations during each measuring period.

20. The radar apparatus according to claim 1, further comprising:

an M/N integrator adjusted to the correlation characteristics of the output signal.

21. The radar apparatus according to claim 1, wherein the radar apparatus comprises MTI radar, and wherein the frequency of a radially moving target is variable by a modulation index that is radial to the radial target or reflector speed.

22. The radar apparatus according to claim 1, wherein the radar apparatus comprises coherent radar operative to reduce a risk of incorrect display of ambiguous echoes in spite of PRI variation.

23. The radar apparatus according to claim 1, wherein the radar apparatus comprises MTI radar, and wherein the PRI variation assists in filtering out fixed or moving ambiguous echoes that have a lower amplitude than reflected impulses from occurring interference reflections.

24. The radar apparatus according to claim 23, wherein the interference reflections are caused by ground clutter or rain clutter.

25. The radar apparatus according to claim 1, wherein the PRI variation is arranged to make possible suppression in the display of asynchronous interference.

26. The radar apparatus according to claim 25, wherein the asynchronous interference originates from other radar stations.

27. The apparatus according to claim 1, further comprises:

an M/N detector operative to work with or to make possible the reception of echoes that arise during a number of measurements in order to give rise to a detection irrespective of the amplitude of the incoming signals.

28. The radar apparatus according to claim 27, wherein the M/N detector is a non-parametric detector.

* * * * *